J. E. ERB.
SCRAPING AND PULVERIZING ATTACHMENT FOR DISK HARROWS.
APPLICATION FILED OCT. 18, 1911.
1,032,998.
Patented July 16, 1912.
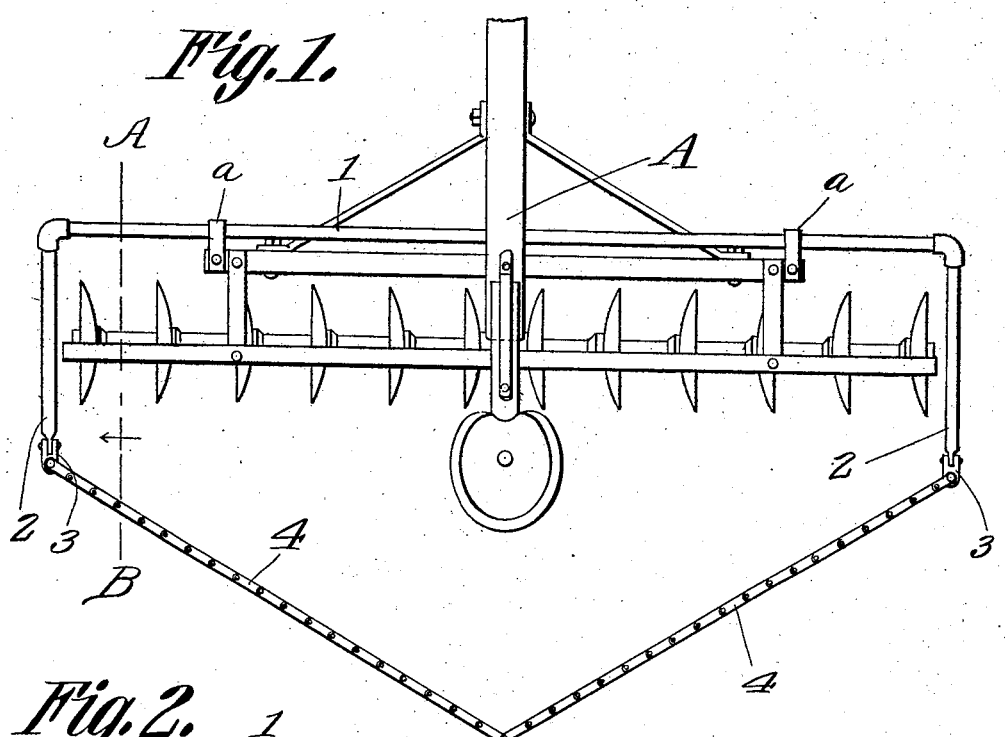
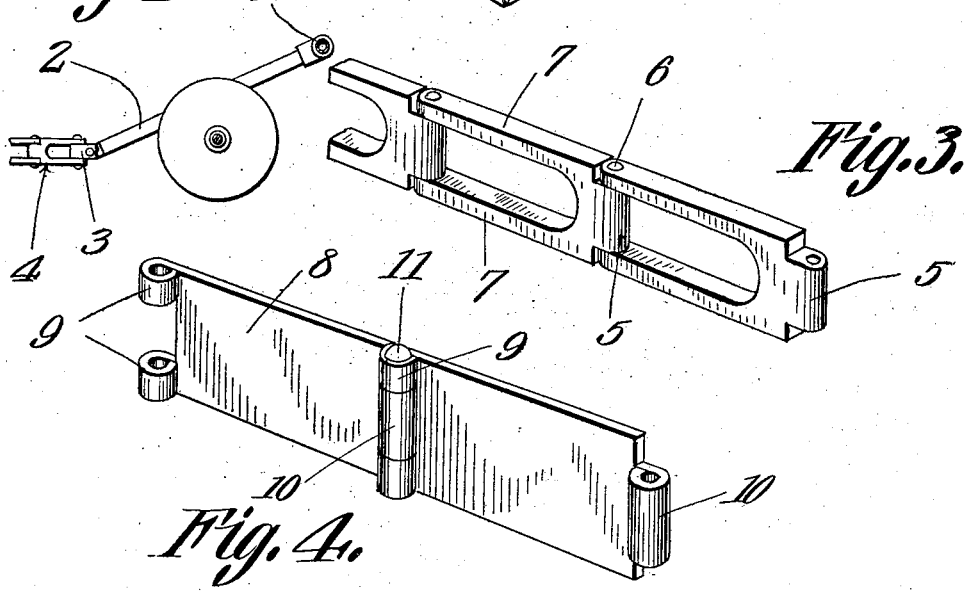
Witnesses
Jacob E. Erb
Inventor,
by
Attorneys.

UNITED STATES PATENT OFFICE.

JACOB E. ERB, OF RYDER, NORTH DAKOTA.

SCRAPING AND PULVERIZING ATTACHMENT FOR DISK HARROWS.

1,032,998. Specification of Letters Patent. Patented July 16, 1912.

Application filed October 18, 1911. Serial No. 655,328.

*To all whom it may concern:*

Be it known that I, JACOB E. ERB, a citizen of the United States, residing at Ryder, in the county of Ward and State of North Dakota, have invented a new and useful Scraping and Pulverizing Attachment for Disk Harrows, of which the following is a specification.

This invention relates to scraping and pulverizing attachments for disk harrows and its object is to provide a device of this character which can be applied readily to an ordinary type of harrow and which is capable of flexing in a plane parallel with the surface over which it is drawn but cannot flex upwardly or downwardly.

A further object is to provide a combined scraper and pulverizer flexible from end to end but having a continuous lower or working edge for engagement with the soil, all portions of said edge being located in the same plane.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a plan view of a disk harrow having the present improvements combined therewith. Fig. 2 is a section on line A—B Fig. 1. Fig. 3 is an enlarged perspective view of a portion of the scraper. Fig. 4 is a similar view showing a portion of a modified form of scraper.

Referring to the figures by characters of reference A designates a harrow structure and extending rearwardly therefrom are brackets *a* in which is mounted a rod or tube 1 having rearwardly and downwardly extending arms 2 at the ends thereof and supported beyond the sides of the harrow structure. Each of these arms is pivotally connected, at its lower end, to a yoke 3 and the two yokes are, in turn, pivotally connected to the end portions of the flexible scraper and pulverizer indicated generally at 4. As shown particularly in Fig. 3, the said scraper and pulverizer is made up of an elongated strip including a series of similar links each of which is substantially U-shaped and has a lug 5 upon the crown or intermediate portion thereof for the reception of a pivot pin 6. The lug 5 is adapted to project between the arms 7 of the next adjoining link and the pivot device 6 extends through these arms and the lug and thus serves to hold the links together so that the chain is free to flex about the axes of the pins 6 but in no other direction. Thus it will be seen that when the flexible element 4 is in contact with the ground and is drawn thereover, the lower edge thereof, will lie with all portions thereof in the same plane. This lower edge extends practically continuously throughout the length of the element 4 and the only possible up and down movement of the said element 4 relative to the structure A is that permitted by reason of the pivotal connections between the yokes 3 and the arms 2.

Instead of forming the element 4 of U-shaped links, such as shown in Fig. 3, the said element can be made up of plates 8, as shown in Fig. 4, each plate having spaced eyes 9 at one end and a single central eye 10 at its other end, the eyes 10 being adapted to fit between the eyes 9 and the alining eyes being arranged to receive pivot pins 11.

It will be apparent that with either form of scraping element described, the surface over which said element is drawn will be properly smoothed and the loosened soil pulverized. By providing an element 4 which can only flex in one plane the rolling action obtained by the use of an ordinary chain is avoided and more efficient results are thus obtained.

What is claimed is:—

1. A scraping and pulverizing attachment for harrows and the like, including a flexible soil engaging element made up of non-flexible soil engaging members placed end to end said element having all parts of its lower or working edge constantly in the same substantially horizontal plane.

2. An attachment for agricultural machines, including a scraper capable of flexing only in a substantially horizontal plane, said scraper being made up of a plurality of non-flexible pivotally connected members.

3. The combination with a harrow and brackets extending therefrom, of a cross bar supported by the brackets, rearwardly extending arms upon the bar, yokes pivotally connected to the arms and adapted to swing upwardly and downwardly relative thereto, and a flexible scraper pivotally connected at its ends to the yokes, said scraper being made up of similar links mounted to swing about parallel axes, the working edge of the scraper being continuous and having all portions thereof constantly disposed in the same plane.

In testimony that I claim the foregoing as my own, I have hereto affixed my signature in the presence of two witnesses.

JACOB E. ERB.

Witnesses:
B. A. DICKINSON,
D. H. JENSEN.

Copies of this patent may be obtained for five cents each, by addressing the "Commissioner of Patents, Washington, D. C."